United States Patent
Kraft et al.

(10) Patent No.: US 9,824,149 B2
(45) Date of Patent: Nov. 21, 2017

(54) OPPORTUNISTICALLY SOLVING SEARCH USE CASES

(71) Applicant: Yahoo! Inc., Sunnyvale, CA (US)

(72) Inventors: Reiner Kraft, Gilroy, CA (US); Viraj Chavan, Sunnyvale, CA (US)

(73) Assignee: EXCALIBUR IP, LLC, New York, NY (US)

( * ) Notice: Subject to any disclaimer, the term of this patent is extended or adjusted under 35 U.S.C. 154(b) by 401 days.

(21) Appl. No.: 14/259,888

(22) Filed: Apr. 23, 2014

(65) Prior Publication Data
US 2015/0310058 A1   Oct. 29, 2015

(51) Int. Cl.
*G06F 7/00*   (2006.01)
*G06F 17/30*   (2006.01)

(52) U.S. Cl.
CPC .. *G06F 17/30864* (2013.01); *G06F 17/30386* (2013.01)

(58) Field of Classification Search
None
See application file for complete search history.

(56) References Cited

U.S. PATENT DOCUMENTS

| | | | | |
|---|---|---|---|---|
| 8,046,348 B1 * | 10/2011 | Rehling | | G06F 17/30386 707/603 |
| 9,239,879 B2 * | 1/2016 | Pan | | G06F 17/30864 |
| 2012/0259801 A1 * | 10/2012 | Ji | | G06N 99/005 706/12 |
| 2012/0265760 A1 * | 10/2012 | Yan | | G06F 17/30864 707/740 |
| 2013/0173650 A1 * | 7/2013 | Marantz | | G06F 17/30864 707/767 |
| 2014/0282136 A1 * | 9/2014 | Marantz | | G06F 17/3097 715/764 |
| 2015/0310491 A1 | 10/2015 | Kraft et al. | | |

OTHER PUBLICATIONS

Diemert et al, "Unsupervised Query Categorization using Automaticallly-Built Concept Graphs", WWW 2009, Apr. 20-24, 2009 Madrid, Spain, pp. 461-470.*
Willem Robert van Hage et al, "A Method for Learning Part-Whole Relations", The Semantic Web—ISWC 2006, LNCS 4273, pp. 723-735, Springer.*
U.S. Appl. No. 14/265,155, "Dynamic text ads based on a page knowledge graph," Kraft et al., filed Apr. 29, 2014.
Google Ads / Ad Innovations, "Dynamic Display Ads," downloaded from http://www.google.com/ads/innovations/dynamicdisplayads.html.

(Continued)

*Primary Examiner* — Uyen Le
(74) *Attorney, Agent, or Firm* — Weaver Austin Villeneuve & Sampson LLP

(57) ABSTRACT

In one embodiment, a search query may be obtained. A set of one or more use cases may be determined based, at least in part, upon the search query. A set of one or more search results may be identified based, at least in part, upon the search query. Information that answers the search query for at least one of the set of use cases may be obtained, where the information has been derived from at least a subset of the set of search results. An indication of at least a portion of the information may be provided.

20 Claims, 8 Drawing Sheets

(56) References Cited

OTHER PUBLICATIONS

Google Ads / Ad Innovations, "Contextual Targeting Tool," downloaded from http://www.google.com/ads/innovations/ctt.html.
MIT Technology Review, "Searching Beyond Search Results," Erica Naone, Jul. 1, 2010, downloaded from http://www.technologyreview.com/news/419627/searching-beyond-ssearch-results/.
Wikipedia "AdSense," last modified Apr. 23, 2014, downloaded from http://en.wikipedia.org/wiki/AdSense.
Yahoo! Labs Technical Report YL-2010-003, "Open information extraction from web search query logs," Alpa Jain et al., Jun. 24, 2010, downloaded from http://labs.yahoo.com/files/YL-2010-003-oie_query_logs.pdf.

* cited by examiner

Taxonomy
- Media
  - In Theater Movies (deep use case work)
  - All Movies
  - Quotes
  - TV Shows
  - Video Games
  - Books
  - Magazines
    - Magazine's Content
  - Song
  - Album
  - Social Networking
- People
  - Person
  - Sports Player/ Athlete (deep use case work)
  - Actors
  - Celebrities
  - In Office Politicians
  - Author
  - Visual Artist
  - Musician
  - Criminals
  - Doctors
- Food & Drink
  - Food
- Products
  - Named Products
  - Product category (not named brand)
  - Mobile Phones
  - Computer Software
  - Apps
  - Automobiles
  - Bicycles
  - Motorcycles
- Places
  - Place I Live In
  - Place to Travel To
  - POI
  - Stadium

FIG. 3

In Theater Movies
    Playing In Theaters
        ShowTimes
        WherePlaying
        SpecificDayShowTime
        NamedTheaterShowTimes
        NamedTheater
        WhatsPlaying
        IsitPlaying
        CheapTheaters
        MapTheaterAddress
        TicketPrice
        SeeFreeCode
        PreScreening
        KindOfTheater – drive ins
        MoviePoster
        LogoOf – logo from the movie ads
        ReviewOf
        ChristianReviews
        CriticsReviews
        FamilyReview - want a parent and kid centered review
        FromSite – name a site they want content from (mostly reviews)
        Trailer
        BuyTickets
        MovieCoupons
        iMax
        3D

FIG. 4

OPPORTUNISTICALLY SOLVING SEARCH USE CASES

BACKGROUND OF THE INVENTION

The disclosed embodiments relate generally to computer-implemented methods and apparatus for providing information to users in response to search queries.

As the internet has become ubiquitous, many times, a search engine is the first stop for a user attempting to find information on the internet about a particular subject. In response to a search query, a user is typically presented with a list of search results. The user must then click on individual search results to find the information they seek.

SUMMARY OF THE INVENTION

The disclosed embodiments enable information answering a search query to be ascertained based, at least in part, upon use cases that are pertinent to the search query. An indication of the information may then be provided in response to the search query, either in addition to or instead of a list of search results.

In one embodiment, a search query may be obtained. A set of one or more use cases that are mapped to the search query may be identified. Information that answers the search query for at least one of the set of use cases may be obtained. An indication of at least a portion of the information may be provided.

In another embodiment, a search query may be obtained. A set of one or more use cases may be determined based, at least in part, upon the search query. In addition, a set of one or more search results may be identified based, at least in part, upon the search query. Information that answers the search query for at least one of the set of use cases may be obtained, where the information has been derived from at least a subset of the set of search results. An indication of at least a portion of the information may be provided.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

BRIEF DESCRIPTION OF THE DRAWINGS

FIG. 3 is a diagram illustrating an example segment of a User Centric Intent Taxonomy that may be implemented in accordance with various embodiments.

FIG. 4 is a diagram illustrating an example entity type that may be implemented in accordance with various embodiments.

DETAILED DESCRIPTION OF THE SPECIFIC EMBODIMENTS

Figure 1:
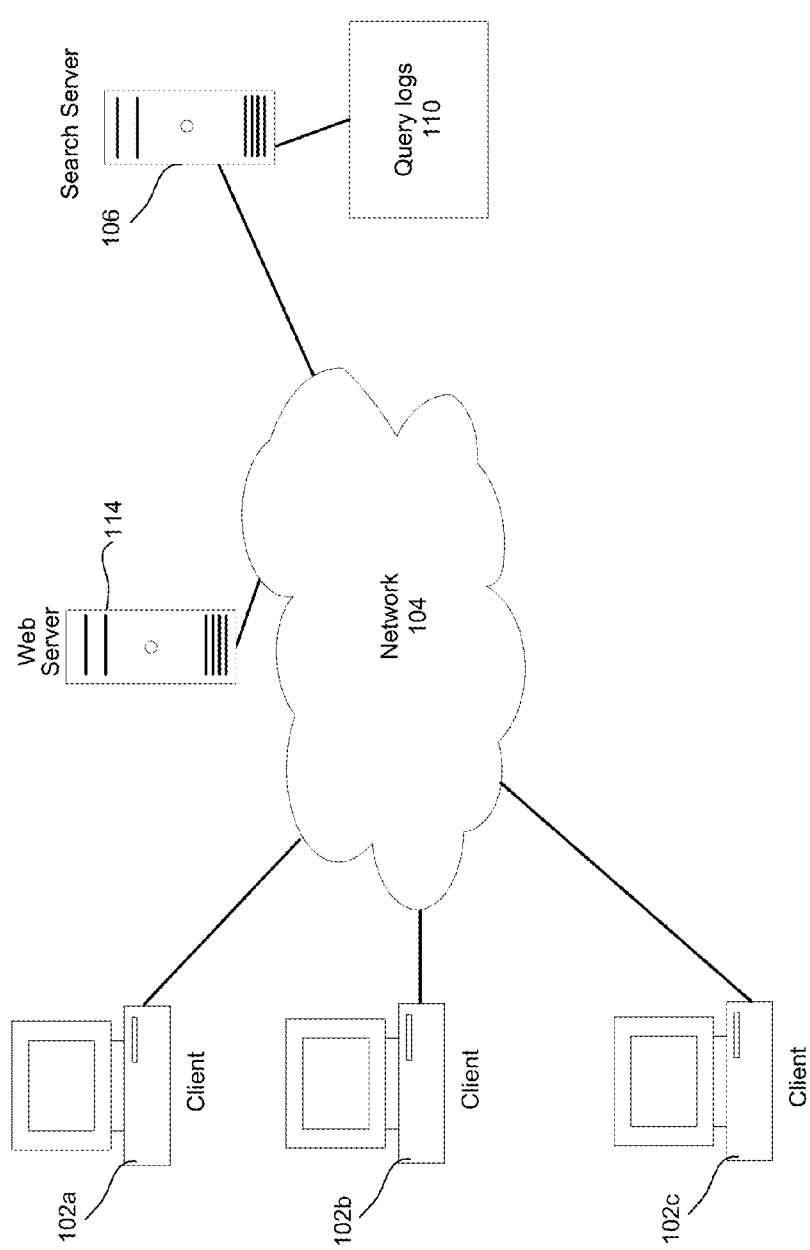
FIG. 1 is a diagram illustrating an example system in which embodiments of the invention may be implemented.

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

In recent years, the Internet has been a main source of information for millions of users. These users rely on the Internet to search for information of interest to them. One conventional way for users to search for information is to initiate a search query through a search service's web page. Typically, a user can enter a query including one or more search term(s) into an input box on the search web page and then initiate a search based on such entered search term(s). In response to the query, the search service typically returns an ordered list of search result documents.

A document may be defined as a Uniform Resource Locator (URL) that identifies a location at which the document can be located. The document may be located on a particular web site, as well as a specific web page on the web site. For instance, a first URL may identify a location of a web page at which a document is located, while a second URL may identify a location of a web site at which the document can be located.

When a search service returns a list of search result documents in response to a user's search query, the user must then determine which search results to view. The user may view numerous documents in his or her search for the desired information. Even after spending a significant amount of time reviewing documents, the user may still have difficulty finding the information they seek. Accordingly, the search process may be a frustrating experience for the user.

Moreover, when a user clicks on a search result, the user may choose to visit one or more other web sites to find the desired information. In these cases, the user navigates away from the search service web site, resulting in fewer opportunities for the web site to present advertisements or other monetizing opportunities to the user. Therefore, the revenue that may be collected by traditional search service web sites as a result of advertisements or other monetizing opportunities is limited.

Today's search services are moving towards becoming a standard tool to solve everyday tasks. For those search related tasks, the search service may provide a solution to that task in order to satisfy the user's intent. In other words, the search service may directly provide the information the user desires. Unfortunately, search services are generally unable to accurately identify the information sought by the user.

In the following description, a search-related task may be referred to as a use case. The term "use case" may refer to a task that the user is trying to accomplish by submitting a search query. For example, popular movie-related use cases include finding show times of a particular movie and searching for reviews of a particular movie. A use case may be represented using various data structures such as an object generated in an object-oriented programming language.

In accordance with various embodiments, a user-centric intent taxonomy (UCIT) may represent a plurality of use cases, as well as relationships among the use cases. In the taxonomy, a use case may be associated with (e.g., mapped to) a set of queries and/or query patterns that may each independently trigger the use case. Conversely, each query or query pattern may be associated with (e.g., mapped to) a set of use cases that may be triggered by the query or query pattern. Thus, a look up in the taxonomy may be performed for a query or query pattern to identify a corresponding set of use cases. Similarly, a look up in the taxonomy may be performed for a use case to identify a corresponding set of queries or query patterns.

A query pattern may be represented in various forms. More particularly, a query pattern may be represented via rule(s) and/or pattern(s) that may be applied to a query to determine whether the query matches the rule(s) and/or pattern(s). Furthermore, a query pattern may be represented via any type of syntax. For example, a query pattern may be described using regular expressions or a syntax similar to regular expressions. In some implementations, a pattern language such as Jabba may be used to describe the query patterns.

Query patterns and mappings between query patterns and use cases can be compiled according to various algorithms. More particularly, the query patterns and/or mappings may be compiled manually by editors based on various session analysis approaches. Furthermore, the query patterns and/or mappings may also be compiled via a computer-learning algorithm. Therefore, each use case may be mapped to a corresponding set of query patterns.

As will be described in further detail below, upon receiving a search query from a user, pertinent use cases may be identified. Information being sought by the user submitting the search query may be obtained based, at last in part, upon the search query and at least one of the use cases. An indication of the information may then be presented to the user. Accordingly, a user may receive an answer to his or her search query without clicking on search results, which may be presented to the user in conjunction with the answer.

Example System

FIG. 1 is a diagram illustrating an example system in which embodiments of the invention may be implemented. As shown in FIG. 1, the system may include one or more servers associated with a web site such as a social networking web site. Examples of social networking web sites include Yahoo, Facebook, Tumblr, LinkedIn, Flickr, and Meme. The server(s) may enable the web site to provide a variety of services to its users. More particularly, users of the web site may maintain public user profiles, interact with other members of the web site, upload files (e.g., photographs, videos), etc.

As shown, a plurality of clients 102a, 102b, 102c may access a search application (i.e., search service), for example, on search server 106 via network 104 and/or access a web service, for example, on web server 114. The network 104 may take any suitable form, such as a wide area network or Internet and/or one or more local area networks (LAN's). The network 104 may include any suitable number and type of devices, e.g., routers and switches, for forwarding search or web object requests from each client to the search or web application and search or web results back to the requesting clients.

The invention may also be practiced in a wide variety of network environments (represented by network 104) including, for example, TCP/IP-based networks, telecommunications networks, wireless networks, etc. In addition, the computer program instructions with which embodiments of the invention may be implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

A search application generally allows a user (human or automated entity) to search for information that is accessible via network 104 and related to a search query including one or more search terms. The search terms may be entered by a user in any manner. For example, a graphical user interface may present an input feature to the client (e.g., on the client's device) so the client can enter a query including one or more search term(s). More particularly, the graphical user interface may present an input box (i.e., search query section) into which a user may type a query including any number of search terms or portion thereof. The user may then submit the query for execution by one or more search applications. In some embodiments, suggested search queries (i.e., search suggestions) may be provided. The user may then select one of the suggested search queries to submit to the search application via the graphical user interface.

The search query may then be executed via the search application (e.g., associated with search server 106 and/or web server 114) with respect to one or more data sources, as will be described in further detail below. The search application may be implemented on any number of servers although only a single search server 106 is illustrated for clarity.

In accordance with various embodiments, in response to receiving a search query, the search server 106 may directly provide an indication of information that answers the search query. In some implementations, the indication may include the information or a portion thereof. In addition, the search server 106 may identify and present a list of search results identifying web pages that are pertinent to the query, which may be presented in conjunction with the information or indication thereof. For instance, the search server 106 may identify and present a plurality of hypertext links that identify content that is pertinent to the search query, as well as present a summary or abstract associated with the plurality of hypertext links.

Embodiments disclosed herein may be implemented via the search server 106 and/or other server(s) and/or the clients 102a, 102b, 102c. For example, various features may be implemented via a web browser and/or application on the clients 102a, 102b, and 102c. The disclosed embodiments may be implemented via software and/or hardware.

The search server 106 (or servers) may have access to one or more query logs 110 into which search information is retained. For example, the query logs 110 may be retained in one or more memories that are coupled to the search server 106. Each time a user performs a search on one or more search terms, information regarding such search may be retained in the query logs 110. For instance, the user's search request may contain any number of parameters, such as user or browser identity and the search terms, which may be retained in the query logs 110. Additional information related to the search, such as a timestamp, may also be retained in the query logs 110 along with the search request parameters. When results are presented to the user based on the entered search terms, parameters from such search results may also be retained in the query logs 110. For example, an identity of the specific search results (e.g., URLs), such as the web sites, the order in which the search results are presented, whether each search result is a sponsored or algorithmic search result, the owner (e.g., web site) of each search result, and/or whether each search result is selected (i.e., clicked on) by the user (if any), may be retained in the query logs 110.

In addition, the server(s) may have access to one or more user logs (e.g., user databases) into which user information is retained. This user information or a portion thereof may be referred to as a user profile. More particularly, the user profile may include public information that is available in a public profile and/or private information. Furthermore, the user profile may include information that has been submitted by the user and/or information that has been deduced or automatically collected by the system (e.g., based upon user action(s)). The user information retained in the user logs may include personal information such as demographic information (e.g., age and/or gender) and/or geographic information (e.g., Global Positioning System (GPS) location, Internet Protocol (IP) address, country region/state, city, and/or zip code), which may include or indicate the user's residence address, work address, and/or current location. A user may be identified in the user logs by a user ID (e.g., user account ID), information in a user cookie, etc. The user logs may be retained in one or more memories.

A variety of mechanisms may be implemented to generate a profile including, but not limited to, collecting or mining navigation history, stored documents, tags, or annotations, to provide a few examples. A profile builder may store a generated profile. Profiles of users of a search engine, for example, may give a search engine provider a mechanism to retrieve annotations, tags, stored pages, navigation history, or the like, which may be useful for making relevance determinations of search results, such as with respect to a particular user.

The disclosed embodiments enable information such as content and/or advertisements to be identified, selected, generated, transmitted, and/or otherwise provided to users in response to a search query. More particularly, the server(s) 102 may provide content and/or advertisements to users via the web site (e.g., via display on a web page of the web site), via electronic mail, Short Message Service (SMS), via a mobile device (e.g., text message), or via another medium such as digital television, which may be connected to the Internet.

Processing Search Queries

Figure 2A:
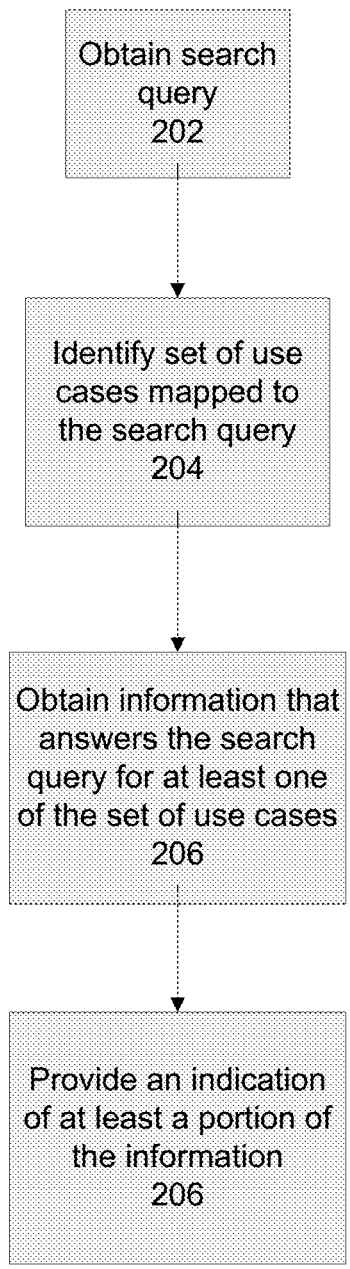
FIGS. 2A-2B are process flow diagrams illustrating example methods of processing a search query in accordance with various embodiments.

FIG. 2A is a process flow diagram illustrating an example method of processing a search query in accordance with various embodiments. A search query may be obtained at 202. For example, the search query may be submitted by a user and received from a remotely located computer or device.

A set of one or more use cases that are mapped to the search query may be identified at 204. More particularly, each use case may be associated with a set of queries or query patterns that may each individually trigger the use case. Conversely, each query or query pattern may be associated with a set of use cases that are triggered by the query or query pattern. As a result, the search query may be compared against query patterns within the taxonomy to identify at least one matching query pattern. The set of use cases that are mapped to the matching query pattern(s) may then be identified.

In some instances, a search context may not be available for answering a search query. Where a search context can be ascertained, the set of use cases may be identified further based, at least in part, upon the search context. The search context may be represented in various forms including, but not limited to, a list of search context terms. The search context can be generated from the current session. More particularly, the search context may be ascertained from context terms explicitly submitted by the user and/or contextual information that may be automatically ascertained.

For example, the search context may include user information pertaining to a user that initiated the search query, such as the user's current, work, or home location or other user profile data (e.g., gender, occupation, etc.). In addition, the search context can be generated from previous sessions. For example, the search context may include the search history of the user, as well as other users. Of course, these examples are merely illustrative. Therefore, the search context may include different or additional forms of context, which can be incorporated at any time.

Information that answers the search query for at least one of the set of use cases may be obtained at 206. More particularly, information that is pertinent to one or more (use case, query) pairs may be obtained. Where a search context can be ascertained, the information may be obtained further based, at least in part, upon the search context. In some embodiments, previously stored information may be retrieved via a lookup process. In other embodiments, the information may be collected from documents in real-time. Various methods of obtaining the pertinent information will be described in further detail below.

An indication of at least a portion of the information may be provided at 208. For example, an indication of at least a portion of the information may be presented in conjunction with a list of search results on a search results page. In this manner, an answer to the search query may be provided directly to the user, with the intention that the answer contains the desired information to prevent the need for the user to click on further search results.

By making the desired information accessible directly on a search results page, users may complete the intended tasks faster. Furthermore, by enhancing the users' search experience, the users may be motivated to return to the search service more frequently. As a result, there may be greater opportunity for the search service to present advertisements to users of the search service.

The indication that is presented in response to a search query may include at least a portion of the information. For example, the indication may include a text answer to the user's search query. As another example, the indication may include a photograph, image (e.g., diagram or chart), video, and/or audio (e.g., bitstream or file).

Figure 2B:
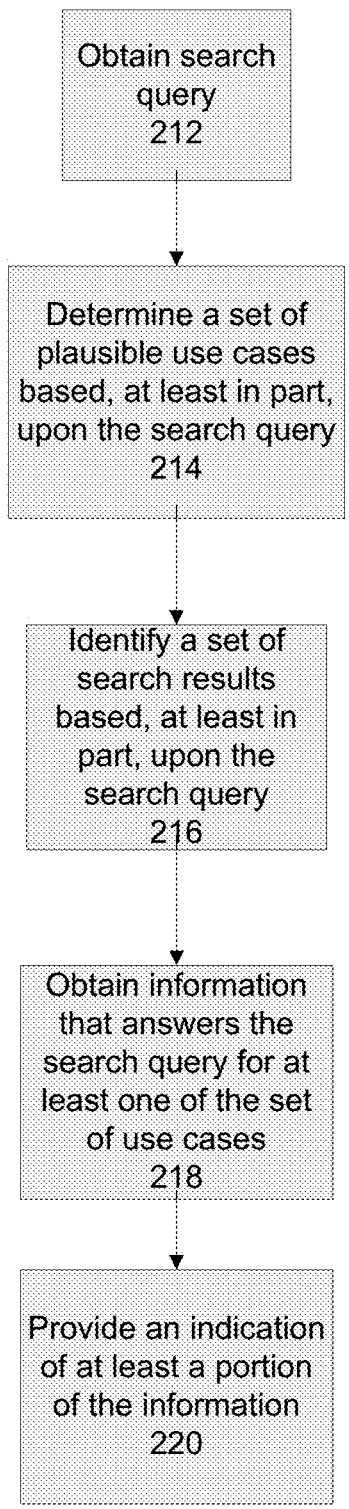

FIG. 2B is a process flow diagram illustrating another example method of processing a search query in accordance with various embodiments. A search query may be obtained at 212. For example, the search query may be submitted by a user and received from a remotely located computer or device such as a mobile device. In addition, a search context, if any, may be ascertained.

A set of plausible use cases may be determined based, at least in part, upon the search query at 214. In addition, the set of plausible use cases may be determined based, at least in part, upon a search context, if any. More particularly, terms in the search query (and optionally terms pertaining to a search context) may be compared against query patterns within the taxonomy to identify at least one matching query pattern. The set of use cases that are associated with the matching query pattern(s) (and optionally terms pertaining to the search context) may then be identified.

Where the set of plausible use cases is large, it may be desirable to further narrow the set of plausible use cases. In some implementations, the set of use cases may be ranked and at least one of the set of use cases may be selected. More particularly, the set of use cases may be ranked based, at least in part, upon relevance to the search query (and possible search context terms). At least one of the set of use cases may be selected according to the ranking.

A set of one or more search results may be identified based, at least in part, upon the search query (and search context, if any) at 216. Where a search context can be ascertained, the search results may be identified further based, at least in part, upon the search context. More particularly, the search query (and search context, if any) may be provided as input to a search engine, which may return a ranked list of search results. While it is possible for a search engine to identify and/or rank the search results based, at least in part, upon at least one of the set of use cases, the examples described herein assume that the search result retrieval process does not incorporate use cases into the identification or ranking of the search results. In some embodiments, the set of search results may be identified via a look up process, as will be described in further detail below.

Since the set of search results may include numerous documents, it may be desirable to identify at least a subset of the set of search results that are most likely to contain an answer to the user's search query. A subset of the set of search results may be identified based, at least in part, upon the ranking of the search results. In addition, other information such as previous click data from past users' sessions that indicates frequency of access of the search results may also be used to identify the subset of the set of search results.

Information that answers the search query for at least one of the set of use cases may be obtained at 218, wherein the information is derived from at least a subset of the set of search results. More particularly, the information that is pertinent to one or more (use case, query) pairs may be obtained. In some embodiments, search result documents may be pre-processed offline to aggregate, process, and store information that may later be retrieved upon receipt of a search query. Thus, information that answers the search query for at least one of the set of use cases may be retrieved from storage for at least a subset of the set of search results. For example, the pertinent (use case, query) pairs may be used as input to retrieve the information that was previously stored in association with each search result in the subset of the search results. In other embodiments, documents may be processed dynamically online in real-time in response to a user query, resulting in the aggregation of information for presentation to a user. For example, the pertinent (use case, query) pairs may be used to extract information from the subset of search results. Various methods of extracting, processing, and retrieving information will be described in further detail below.

An indication of at least a portion of the information may be provided at 220. For example, an indication of at least a portion of the information may be presented in conjunction with a list of search results. In this manner, an answer to the search query may be provided directly in response to the search query, eliminating the need for the user to click on search results.

FIG. 3 is a diagram illustrating an example segment of a User Centric Intent Taxonomy that may be implemented in accordance with various embodiments. The taxonomy may include a plurality of categories (i.e., domains). In this example, the domains include media, people, food & drink, products, and places. Each domain may be associated with one or more entity types. In accordance with various embodiments, the term "entity type" may refer to a thing, concept, or event. In this example, the domain "media" is associated with entity types "In Theater Movies," "All Movies," "Quotes," "TV Shows," "Video Games," "Books," "Magazines," "Song," "Album," and "Social Networking."

FIG. 4 is a diagram illustrating an example entity type in accordance with various embodiments. In this example, the entity type "In Theater Movies" is illustrated. Each entity type may be associated with one or more use cases. In this example, the entity type "In Theater Movies" is associated with a general use case "Playing In Theaters," as well as specific use cases "ShowTimes," "Whereplaying," "SpecificDayShowtime," "NamedTheaterShowTimes," "NamedTheater," "WhatsPlaying," "IsitPlaying," "CheapTheaters," "MapTheaterAddress," "TicketPrice," "SeeFreeCode," "PreScreening," "KindofTheater" (e.g., drive ins), "MoviePoster," "LogoOf" (logo from the movie ads), "ReviewOf," "ChristianReviews," "CriticsReviews," "FamilyReview" (e.g., family-centric review), "FromSite," "Trailer," "BuyTickets," "MovieCoupons," "iMax," and "3D."

Each use case may be associated with an entity type. In this example, the use case "ShowTimes" is associated with the entity type "InTheaterMovies." In addition, as discussed above, each use case may be associated with a set of queries and/or query patterns that trigger the use case.

Each query pattern may include one or more entity classes (e.g., [location], [movie], [product]). A query pattern may further include one or more additional terms such as context terms. Context terms may include terms submitted by users (e.g., in the search query) to further narrow and refine the use case in an intuitive way.

Each use case and entity type may have associated metadata. More particularly, the metadata may describe the corresponding use case or entity type in more detail or represent properties of the use case or entity type. For example, query patterns (or queries) may be a property of a use case. Such metadata can be editorially obtained, curated and maintained, but can also be obtained using an algorithmic approach or a combination of editorial/algorithmic approach.

To further illustrate the application of the disclosed embodiments, an example method of processing a search query will be described in further detail below.

Example Embodiment

Step 1: Determine Set of Use Cases

Once a search query has been obtained, a set of plausible use cases may be determined based, at least in part, upon the search query. In addition, where a search context (e.g., current user location) is available and can be ascertained, the set of plausible use cases may be determined based, at least in part, upon the search context. More particularly, the set of use cases may be obtained by using the search query and possibly a search context, if any, as inputs to the taxonomy.

As described above, each use case in the taxonomy may be associated with an entity type. For example, the use case "ShowTimes" may be associated with the entity type "InTheaterMovies." In addition, a query pattern may contain one or more entity classes (e.g., [location], [movie], [product]) and possible context terms. For example, a user may type in the name of the movie (entity) and a context like "showtimes" that refines the use case. A popular use case for the "InTheaterMovies" entity type is the "Showtimes" use case, meaning that a user is interested in learning about current show times of a movie at a given or nearby movie theater. A set of query patterns associated with this use case may include one or more rules and/or patterns such as "[movie][location] [theater_name] showtimes." An example query that would match this query pattern is "Gravity Santa Clara AMC showtimes." This use case could also be associated with a similar query pattern "[movie] [location] where playing" and/or other variations of some or all of those entity types and possibly additional context terms.

For a given query Q, the query may be parsed into segments and corresponding entity types may be ascertained. In addition, any search context such as the user's current location or user profile data may also be used to generate additional segments (e.g., terms derived from the search context), for which corresponding entity types may be identified. In some embodiments, the segmentation and identification of possible corresponding entity types may be accomplished using a technology such as entity SQL or another query language. For example, the query "Gravity Santa Clara AMC showtimes" may be split up into the following segments (showing the token number from, to in parenthesis) along with a (possible) entity type:

Gravity (0)[movie]
Santa (1)
Clara (2)
AMC (3) [theater_name]
showtimes (4)
Santa Clara (1,2) [location]

In other embodiments, a knowledge graph (KG) may be accessed to look up the segments and determine a list of possible entity types for each segment. For example, a knowledge base such as Freebase may be accessed to identify possible entity types for each segment. In this manner, queries may be subdivided into segments and possible entity types may be identified for each segment.

Once a query is divided into segments and possible entity types are identified for each, it is possible to determine whether a query matches any of the query patterns in the taxonomy. In this example, the query "Gravity Santa Clara AMC showtimes" may match a query pattern for the InTheaterMovie:Showtimes use case, as we have:

Gravity (0)[movie]
Santa Clara (1,2) [location]
AMC (3) [theater_name]Showtimes

Therefore, upon identifying a query pattern matching the query, a set of one or more use cases associated with the query pattern may be ascertained.

In more complex examples, queries can be more noisy, have more ambiguous terms, and the KG or query language may return a list of possible entities types for a segment instead of one entity type (due to ambiguity). Since queries can often be quite ambiguous, the matching of a query to a given query pattern and corresponding set of use cases therefore has some probability associated therewith. Furthermore, for queries that do not include context terms (e.g., a location) and for which a search context is not available or cannot be ascertained, there may be too many matches. For example, [movie] as a pattern might trigger the Showtimes use case, but can also trigger hundreds of other use cases related to movies. To simplify the description, the example queries discussed herein include context terms or have an associated search context that may be ascertained.

Step 2: Select at Least a Subset of the Set of Use Cases

Where a search query contains enough context terms such as "Showtimes" or "Where playing" or where the search context can otherwise be obtained and is more precise, the matching between the search query and the query patterns becomes more stringent and may therefore return a relatively small set of use cases. However, where the search context is limited, omitted, or unavailable for a given search query, there may be numerous matching search queries and therefore the set of use cases may include hundreds of use cases. In such instances, a subset of the set of use cases may be selected to narrow the possible use cases to a smaller list of use case candidates.

In various embodiments, the set of use cases may be narrowed to a smaller list of use cases (e.g., where the set of use cases determined for the search query is greater than a minimum threshold amount). More particularly, the set of use cases can be ranked and at least one use case in the set of use cases may be selected according to the ranking. For example, the use cases may be ranked based, at least in part, on the overall relative frequency with which documents matching the use cases are accessed. In some implementations, the set of use cases may be ranked using search query logs and/or other information such as that retrieved from external systems such as Wikipedia or Twitter. For example, clicks and page views associated with documents corresponding to the use cases may be ascertained and a learning feedback model can be generated. Using the model, the set of use cases may be ranked. At least one use case may then be selected from the ranked set of use cases.

Step 3: Obtain Search Results

When the search query and possibly a search context, if available, are run by the search engine, the search engine may return a set of search results including a list of ranked URLs. In addition, the search engine may return metadata associated with the ranked URLs.

Since the set of search results may include numerous documents, it may be desirable to further narrow the set of search results to a smaller set of search results. In some embodiments, this may be accomplished by determining click data for each URL in the list of ranked URLs for a given timeframe so that a distribution of clicks over the search results may be ascertained. The click data may be determined online for the search results. Alternatively, the click data may be determined offline for all URLs and an index data structure may be created so that the click data associated with each search result URL may be retrieved at a later time. The set of search result URLs may be ranked using the click data associated with the search result URLs. For example, the documents may be ranked based, at least in part, on the overall relative frequency with which documents are accessed.

At least a subset of the set of search results may be identified and downloaded. More particularly, the top k ranked search result documents may be fetched and downloaded into a document store for further processing. Alternatively, since the URL fetching and processing is time and labor intensive, this can be done offline and the documents may be stored for later retrieval, as described below.

In accordance with various embodiments, a mapping between each query (or query pattern) and a corresponding set of URLs (e.g., ranked list of URLs) may be maintained.

$Q => u_1, u_2, u_3, \ldots, u_k$

In addition, the documents associated with each URL may also be maintained (e.g., downloaded). Furthermore, from the steps 1 and 2 above, each query (or query pattern) may be mapped to a ranked set of use cases.

$Q => UC_1, UC_2, UC_3, \ldots, UC_m$

Through transitivity this results in a mapping from URLs to use cases.

$u_i => q_1, \ldots, q_k => UC_1, \ldots, UC_m$

Each URL may potentially be mapped to a large set of queries (or query patterns), and each of these queries (or query patterns) may be mapped to a set of use cases, which may be ranked as set forth above. It is therefore possible to compute (e.g., offline) a set of (query, use case) pairs for which a URL represents a possible candidate to contain the answer. In other words, information contained in a given URL can satisfy possibly many (query, use case) pairs. For example, consider a document that lists the production costs of 1,000 popular movies from the past few years. The information contained in that document could therefore solve the "ProductionCost" use case for 1000 movie entities represented in queries. While it is possible to extract the information that would be pertinent to each (query, use case) pair (e.g., to ascertain the production costs of 1,000 movies) and store this information, it may be desirable to extract the information that is pertinent to only the current query.

For example, suppose a document $u_1$ contains three information items (e.g., facts): use case u1 (ProductionCost), AB, and C. As a result, for this document, there are two possible (query, use case) pairs ($Q_A$, Production Cost) and ($Q_C$, ProductionCost). Thus, a mapping may be generated offline and maintained between the document u1 and these two (query, use case) pairs. At a later time, the information items A and C may be extracted from the document $u_1$ to solve one or both of these (query, use case) pairs, as is appropriate to the (query, use case) pairs that are pertinent to a given query. In other words, the information may be extracted at a later time when requested via a submitted search query. Alternatively, the information may be extracted for all (query, use case) pairs for retrieval at a later time, as described below.

Step 4: Document Processing

Information for (search query, use case) pairs, resulting from mapping the search query to the set of plausible use cases (or subset thereof), may be extracted from search results and possibly further processed online in real-time in response to a search query. More particularly, the information that answers the search query for a set of use cases may be obtained by extracting text snippets for each (query, use case) pair from at least a subset of the set of search results (e.g., list of clicked URLs). In this manner, a subset of the search result web pages may be mined to extract relevant snippets of text that contain the answer to the search query and the desired use cases.

Alternatively, since the extraction process can be resource intensive, information for (query pattern, use case) pairs may be extracted from documents and possibly further processed in batch process offline and stored for subsequent retrieval at the time of processing a search query. In other words, an offline process may perform an extraction process on a plurality of documents, where text snippets are extracted from a particular document for all corresponding (query pattern, use case) pairs. Each text snippet (or summary generated from multiple text snippets) may be stored in association with the corresponding document and pertinent (query pattern, use case) pair(s). Accordingly, a potential answer to a search query for a particular use case may be stored for subsequent retrieval.

Given a use case, a specific query (or query pattern), and a document that possibly contains the answer to the (query, use case) pair, information such as text snippets may be extracted from the document (or retrieved, if previously stored). The use case may include metadata that can be used to perform the extraction task. More particularly, the keywords that are searched for in the document may include segments or terms from the search query and/or query pattern. For example, if a query pattern includes a context term of "showtimes," then this term can be useful as a keyword when analyzing the document. As another example, where the search query that was submitted by the user includes a location "Santa Clara" and the movie name "Gravity," these terms may be used as additional keywords during the extraction task. As discussed above, the same URL can contain answers for different queries based on the same use case. For example, a single document may include a list of showtimes to satisfy the query "Gravity Santa Clara AMC showtimes" and the query "Ender's Game Santa Clara AMC Showtimes".

In some embodiments, the document may be searched for occurrences of terms in the search query itself and possibly the context terms from the use case (e.g., "Showtimes"). In addition, the document may be searched for occurrences of additional search context terms, if available. A number of information extraction algorithms may be applied to extract information from documents for a given (use case, query) pair.

Various existing platforms and tools may be leveraged to assist with the extraction process. For example, the Content Analysis Platform (CAP) may perform pre-processing tasks such as Hyper Text Markup Language (HTML) parsing, tokenization, and language detection, along with further tasks such as detection of entities, classifying pages into categories etc. More particularly, the CAP may output an annotation set that represents a semantic representation of the document. CAP may also summarize a document to identify a short excerpt that represents the essence of the document. By implementing a summarizer applying a summarization algorithm such as the CAP summarization algorithm to take as input a list of context terms (e.g., derived from the use case, the search query, and other search context, if available), the summarizer may be biased to summarize using these keywords.

Furthermore, by leveraging the Document Object Model (DOM) structure of the HTML documents, it is possible to expand the summary so that it is cohesive around the use case terms. For a given document, the extraction step may result in zero or more snippets of text that summarizes the information that satisfies the use case. In accordance with various embodiments, each URL and corresponding (use case, query pair) may be mapped to a set of text snippets in a data structure.

Step 5: Aggregate and Post-Process Snippets

The text snippets may be further aggregated and processed to generate the information that is provided to the user. For a particular (query, use case) pair, as multiple documents are analyzed to extract text snippets, it is likely that the extraction process will result in redundant information, as well as complementary information that becomes useful when combined.

In one embodiment, each snippet may be collected. A content hash may be created for each snippet to avoid adding identical snippets to the collection. Furthermore, a similarity measurement may be applied between two snippets (e.g., using a standard information retrieval methodology of Term Frequency-Inverse Document Frequency (TFIDF) and cosine similarity). If two snippets are determined to be very similar given the similarity measurement, then one of the two snippets may be discarded.

At least a subset of the text snippets can be further processed to extract semantic structured and/or unstructured data. The extracted data can be used as an input to a knowledge base or a search index. In some embodiments, the data may be used in conjunction with advertising systems to identify an advertisement that is suitable for the particular context. An advertisement may pertain to a product or service, which may be delivered, for example, via the Internet, email, text message, or digital television. More particularly, an advertisement may include text, one or more images, video, and/or audio. In addition, an advertisement may also include one or more hypertext links, enabling a user to proceed with the purchase of a particular product or service.

As described above, by aggregating and post-processing text snippets for a given (use case, query) pair, it is possible to obtain and store information for look up at a later time. For example, upon receiving a user search query, it is possible to perform a look up for each pertinent (use case, query) pair, as described below.

Step 6: Running a Query

As set forth above, documents may be processed offline to expedite the process of responding to a search query. As a result, indexing may be used to facilitate efficient retrieval of previously stored mappings and data.

When a search query (and optional search context) is received, at least one matching query pattern may be identified based, at least in part, upon the search query (and optional search context). A set of plausible use cases (e.g., list of ranked use cases) may be obtained based upon the matching query pattern(s) (and optional search context). As described herein, the set of use cases may be further narrowed (e.g., based upon search context). A set of one or more (query, use case) pairs representing the query-use case mappings may be generated.

A set of ranked search results associated with the search query (and search context, if any) may be obtained (e.g., via a search engine). Where the set of search results includes a large number of documents, the set of search results may be narrowed. More particularly, click data associated with the set of search results may be retrieved, enabling the search results to be ranked according to frequency of access of the documents. Given a ranked set of search results, at least a portion of the set of search results may be selected such that a narrowed list of documents is identified.

Given the list of documents ($u_1, \ldots, u_k$) and the set of (query, use case) pairs, previously stored information derived from aggregated snippets may be retrieved, as discussed above with reference to step 5. An indication of at least a portion of the information may then be provided for display to the user that initiated the search query. For example, at least a portion of the aggregated snippets may be presented for display via a search results page in conjunction with a set of search results.

In this example, when the query is executed, the information that was previously aggregated is retrieved via a look up process. Alternatively, in other embodiments, rather than storing and processing text snippets offline, the text snippets may be extracted and processed online. For example, the (query, use case) pairs may be used to extract information from documents in the list of documents according to previously established mappings between (query, use case) pairs and those documents.

It is important to note that the above-described embodiments are merely illustrative. Thus, other implementations in which various steps may performed offline or online are possible. For example, although the above-described embodiments refer to the retrieval of text snippets, the information that is retrieved may also include other forms of information such as photographs or other images (e.g., charts or diagrams), videos, and/or audio. As another example, although the indication is described as being provided via a web page, the indication may also be provided by transmitting a message such as a text message.

The disclosed embodiments enable queries to be mapped to use cases, thereby generating one or more (query, use case) pairs. The (query, use case) pairs may serve as an input for retrieving or extracting information to satisfy the query and use case(s) from search result document(s). Accordingly, users are more likely to find the desired information directly in a shorter amount of time and with fewer clicks.

The disclosed embodiments may simplify and expedite the process by which users can solve their information need. As a result, users are more likely to return to the search service. Accordingly, the opportunities for presenting advertisements to users via the search service website may be increased.

Network

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Content Distribution Network

A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Peer-to-Peer Network

A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Wireless Network

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Internet Protocol

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of networks. The Internet includes LANs, WANs, wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Network Architecture

Figure 5:
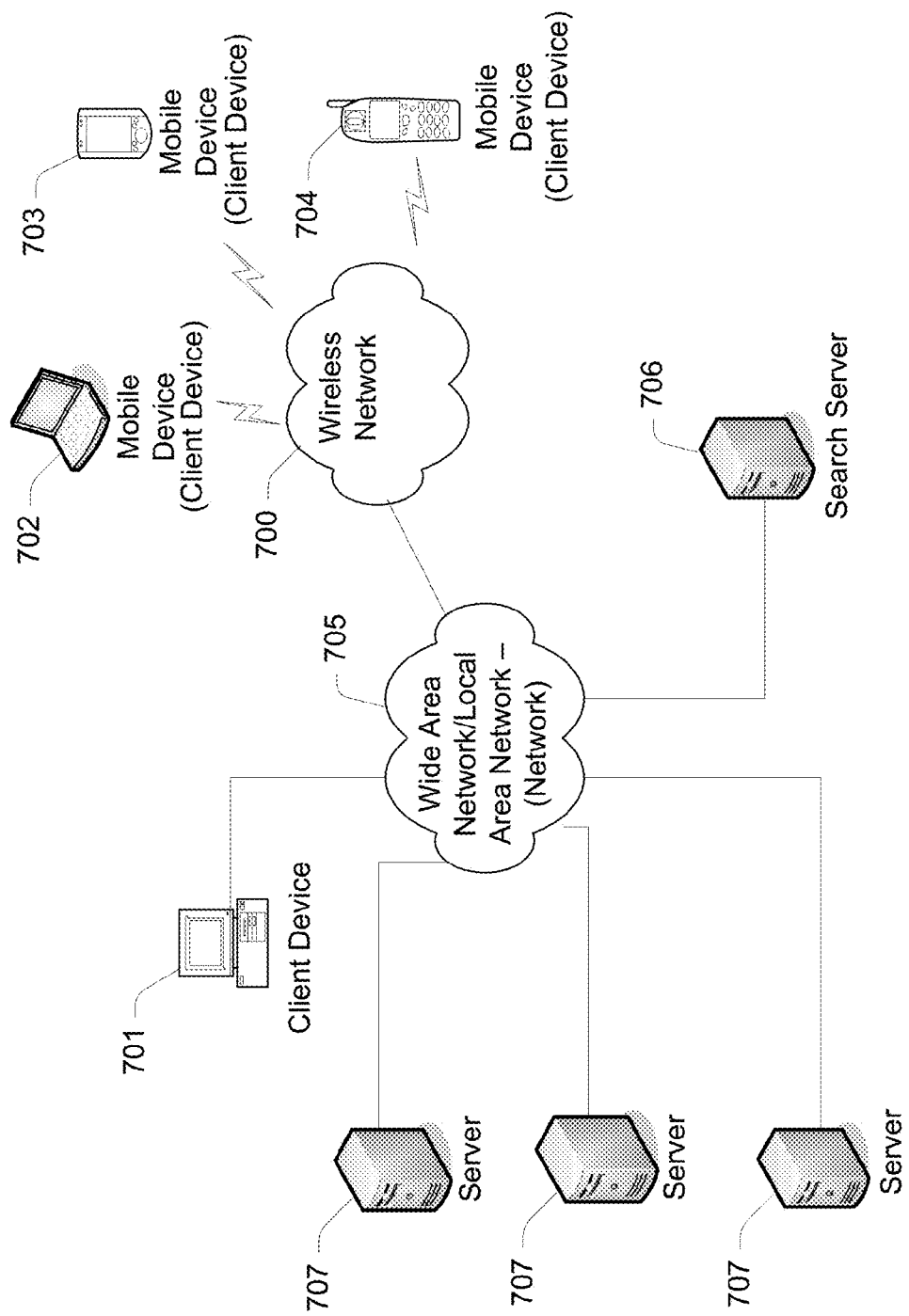
FIG. 5 is a schematic diagram illustrating an example embodiment of a network in which various embodiments may be implemented.

The disclosed embodiments may be implemented in any of a wide variety of computing contexts. FIG. 5 is a schematic diagram illustrating an example embodiment of a network. Other embodiments that may vary, for example, in terms of arrangement or in terms of type of components, are also intended to be included within claimed subject matter. Implementations are contemplated in which users interact with a diverse network environment. As shown, FIG. 5, for example, includes a variety of networks, such as a LAN/WAN 705 and wireless network 700, a variety of devices, such as client devices 701-704, and a variety of servers such as content server(s) 707 and search server 706. The servers may also include an ad server (not shown). As shown in this example, the client devices 701-704 may include one or more mobile devices 702, 703, 704. Client device(s) 701-704 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

The disclosed embodiments may be implemented in some centralized manner. This is represented in FIG. 5 by server(s) 707, which may correspond to multiple distributed devices and data store(s). The server(s) 707 and/or corresponding data store(s) may store user account data, user information, and/or content.

Server

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Content Server

A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

Client Device

Figure 6:
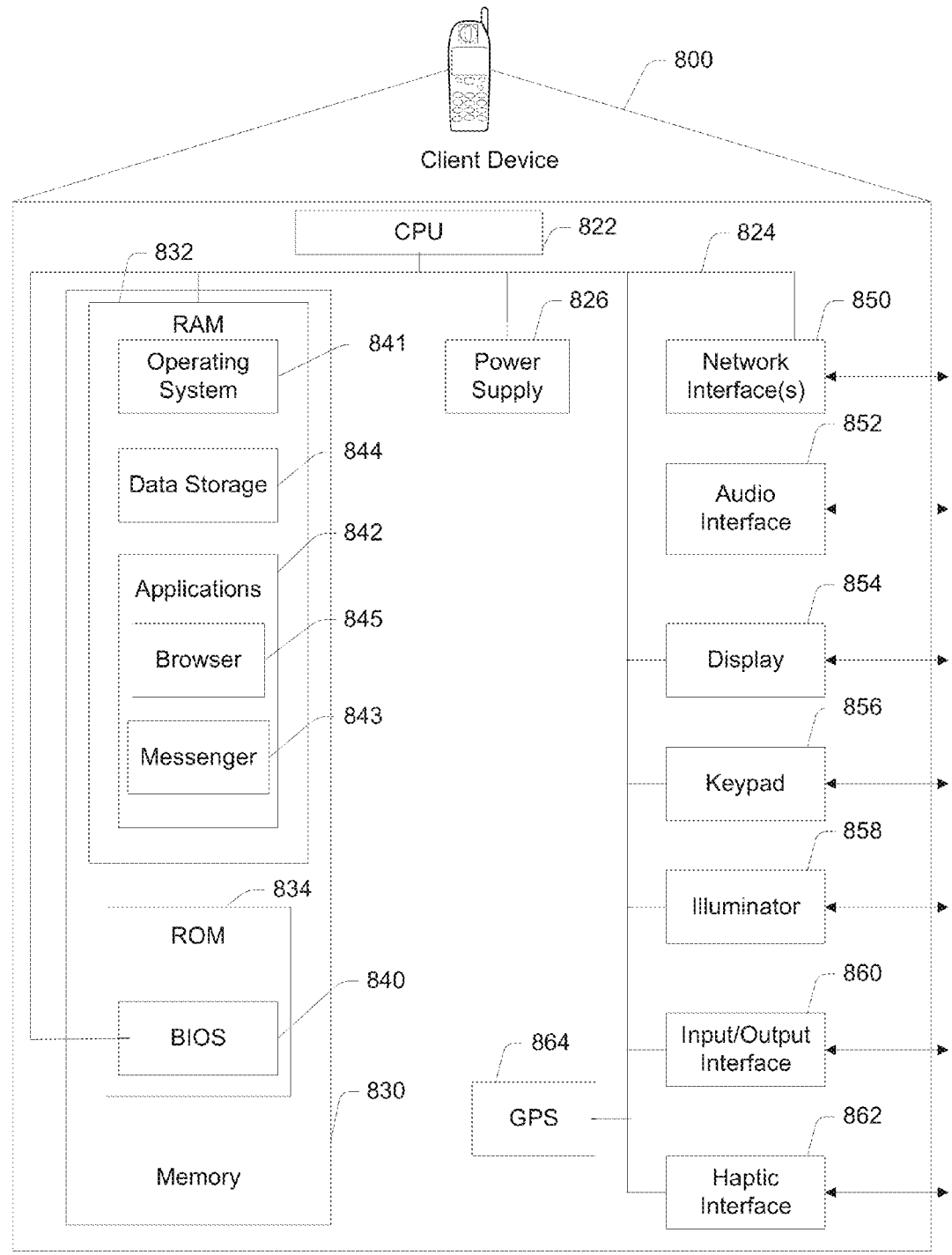
FIG. 6 is a schematic diagram illustrating an example client device in which various embodiments may be implemented.

FIG. 6 is a schematic diagram illustrating an example embodiment of a client device in which various embodiments may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A portable device may also be referred to as a mobile device or handheld device.

As shown in this example, a client device 800 may include one or more central processing units (CPUs) 822, which may be coupled via connection 824 to a power supply 826 and a memory 830. The memory 830 may include random access memory (RAM) 832 and read only memory (ROM) 834. The ROM 834 may include a basic input/output system (BIOS) 840.

The RAM 832 may include an operating system 841. More particularly, a client device may include or may execute a variety of operating systems, including a personal computer operating system, such as a Windows, iOS or Linux, or a mobile operating system, such as iOS, Android, or Windows Mobile, or the like. The client device 800 may also include or may execute a variety of possible applications 842 (shown in RAM 832), such as a client software application such as messenger 843, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 800 may also include or execute an application to communicate content, such as, for example, textual content, multimedia content, or the like, which may be stored in data storage 844. A client device may also include or execute an application such as a browser 845 to perform a variety of possible tasks, such as browsing, searching, playing various forms of content, including locally stored or streamed video, or games (such as fantasy sports leagues).

The client device 800 may send or receive signals via one or more interface(s). As shown in this example, the client device 800 may include one or more network interfaces 850. The client device 800 may include an audio interface 852. In addition, the client device 800 may include a display 854 and an illuminator 858. The client device 800 may further include an Input/Output interface 860, as well as a Haptic Interface 862 supporting tactile feedback technology.

The client device 800 may transmit and detect patterns, images, or signals such as infra-red signals via the interface(s). For example, the client device 800 may transmit an infra-red blink pattern, as well as detect an infra-red blink pattern, as described herein.

The client device 800 may vary in terms of capabilities or features. Claimed subject matter is intended to cover a wide range of potential variations. For example, a cell phone may include a keypad such 856 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 864 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input for downloading or launching an application may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

Figure 7:
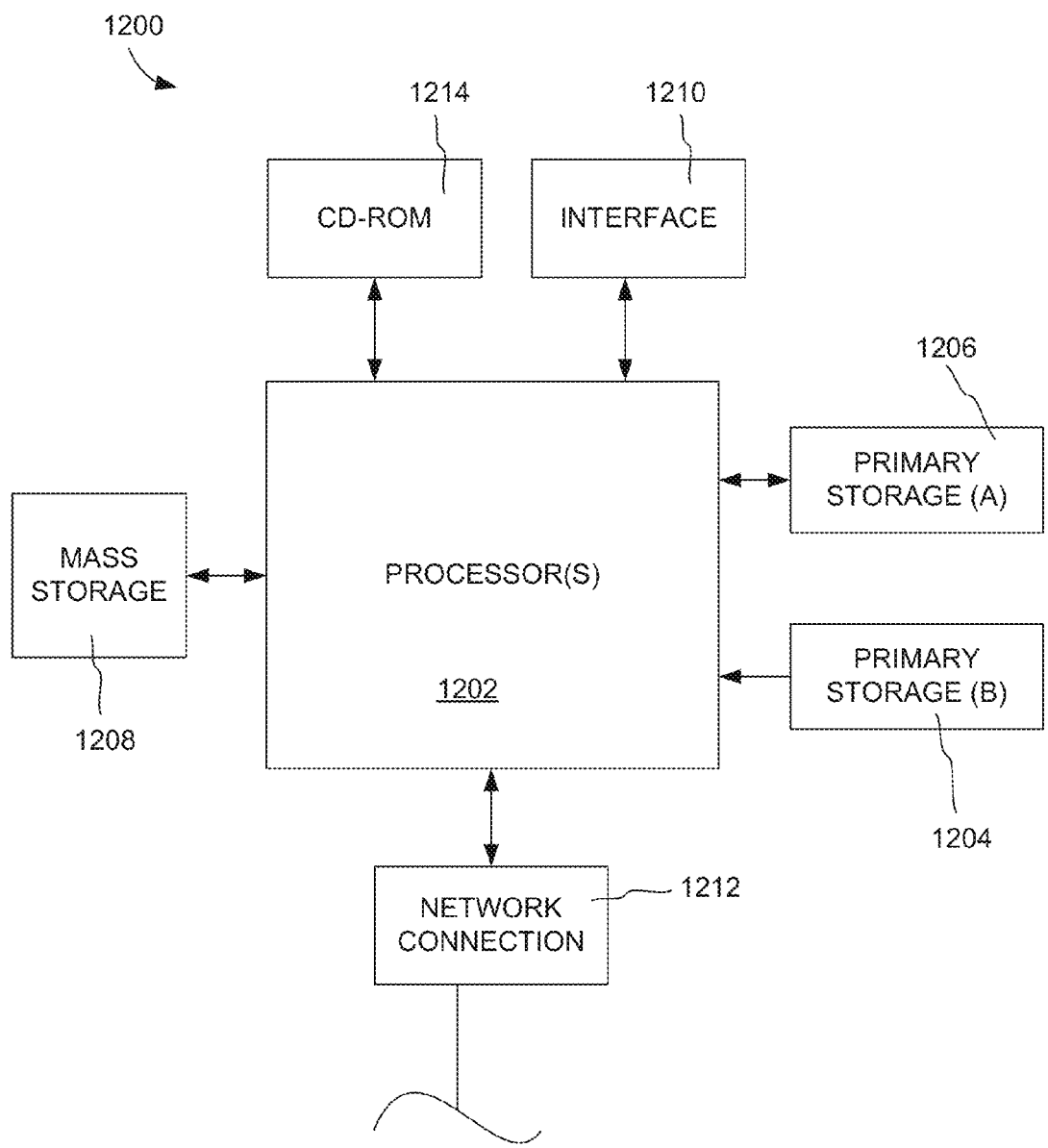
FIG. 7 is a schematic diagram illustrating an example computer system in which various embodiments may be implemented.

FIG. 7 illustrates a typical computer system that, when appropriately configured or designed, can serve as a system via which various embodiments may be implemented. The computer system 1200 includes any number of CPUs 1202 that are coupled to storage devices including primary storage 1206 (typically a RAM), primary storage 1204 (typically a ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various embodiments are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or desktop computer system. Moreover, a system implementing various embodiments may be a portable device, such as a laptop or cell phone. An apparatus and/or web browser may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
    obtaining a search query;
    ascertaining a search context associated with the search query;
    determining a set of one or more use cases based, at least in part, upon the search query and the search context, wherein each use case is associated with a set of query patterns that trigger the use case, wherein determining a set of one or more use cases based, at least in part, upon the search query and the search context includes:
        ascertaining one or more query patterns based, at least in part, upon the search query and the search context; and
        identifying at least a subset of use cases associated with the query patterns;
    identifying a set of one or more search results based, at least in part, upon the search query, wherein identifying the set of search results includes identifying, for each query pattern-use case pair, a set of documents;
    obtaining information that answers the search query for at least one of the set of use cases, the information being derived from at least a subset of the set of search results; and
    providing an indication of at least a portion of the information.

2. The method as recited in claim 1, wherein the indication comprises at least a portion of the information.

3. The method as recited in claim 1, further comprising:
    providing a list of at least a portion of the set of search results;

wherein the indication of at least a portion of the information is provided in conjunction with providing the list of at least a portion of the set of search results.

4. The method as recited in claim 1, wherein obtaining information that answers the search query for at least one of the set of use cases comprises:
   for each query-use case pair, extracting text snippets from at least a subset of the set of search results; and
   generating the information based, at least in part, upon the text snippets that have been extracted for each query-use case pair.

5. The method as recited in claim 1, wherein obtaining information that answers the search query for at least one of the set of use cases comprises:
   for each query-use case pair, identifying a subset of the set of search results mapped to the query-use case pair and extracting text snippets from the subset of the set of search results; and
   generating the information based, at least in part, upon the text snippets that have been extracted for each query-use case pair.

6. The method as recited in claim 1, wherein obtaining information that answers the search query for at least one of the set of use cases comprises:
   retrieving, for each query-use case pair, at least a portion of previously stored information derived from at least a subset of the set of search results.

7. The method as recited in claim 1, further comprising:
   maintaining, for each of a plurality of documents, a mapping between the document a corresponding set of (query, use case) pairs.

8. The method as recited in claim 1, wherein obtaining information that answers the search query for at least one of the set of use cases comprises:
   for each query-use case pair, retrieving at least one text snippet stored in association with a document mapped to the query-use case pair; and
   generating the information based, at least in part, upon the text snippet that has been retrieved for each query-use case pair.

9. An apparatus, comprising:
   a processor; and
   a memory, at least one of the processor or the memory being adapted for:
   obtaining a search query;
   determining a set of one or more use cases based, at least in part, upon the search query, wherein each use case is associated with a set of query patterns that trigger the use case, wherein determining a set of one or more use cases based, at least in part, upon the search query includes:
      ascertaining one or more query patterns based, at least in part, upon the search query; and
      identifying at least a subset of use cases associated with the query patterns;
   identifying a set of one or more search results based, at least in part, upon the search query, wherein identifying the set of search results includes identifying, for each query pattern-use case pair, a set of documents;
   obtaining information that answers the search query for at least one of the set of use cases, the information being derived from at least a subset of the set of search results; and
   providing an indication of at least a portion of the information.

10. The apparatus as recited in claim 9, at least one of the processor or the memory being adapted for performing operations, further comprising:
   providing a list of at least a portion of the set of search results;
   wherein the indication of at least a portion of the information is provided in conjunction with providing the list of at least a portion of the set of search results.

11. The apparatus as recited in claim 9, wherein obtaining information that answers the search query for at least one of the set of use cases comprises:
   for each query-use case pair, extracting text snippets from at least a subset of the set of search results; and
   generating the information based, at least in part, upon the text snippets that have been extracted for each query-use case pair.

12. The apparatus as recited in claim 9, wherein obtaining information that answers the search query for at least one of the set of use cases comprises:
   for each query-use case pair, identifying a subset of the set of search results mapped to the query-use case pair and extracting text snippets from the subset of the set of search results; and
   generating the information based, at least in part, upon the text snippets that have been extracted for each query-use case pair.

13. The apparatus as recited in claim 9, wherein obtaining information that answers the search query for at least one of the set of use cases comprises:
   retrieving, for each query-use case pair, at least a portion of previously stored information derived from at least a subset of the set of search results.

14. The apparatus as recited in claim 9, wherein each use case is associated with an entity type.

15. The apparatus as recited in claim 9, wherein the indication comprises at least a portion of the information.

16. A system, comprising:
   means for determining a set of one or more use cases based, at least in part, upon a search query, wherein each use case is associated with a set of query patterns that trigger the use case, wherein determining a set of one or more use cases based, at least in part, upon the search query includes:
      ascertaining one or more query patterns based, at least in part, upon the search query; and
      identifying at least a subset of use cases associated with the query patterns;
   means for identifying a set of one or more search results based, at least in part, upon the search query, wherein identifying the set of search results includes identifying, for each query pattern-use case pair, a set of documents;
   means for obtaining information that answers the search query for at least one of the set of use cases, the information being derived from at least a subset of the set of search results; and
   means for providing an indication of at least a portion of the information.

17. The system as recited in claim 16, wherein obtaining information that answers the search query for at least one of the set of use cases comprises:
   for each query-use case pair, extracting text snippets from at least a subset of the set of search results; and
   generating the information based, at least in part, upon the text snippets that have been extracted for each query-use case pair.

18. The system as recited in claim 16, wherein obtaining information that answers the search query for at least one of the set of use cases comprises:
- retrieving, for each query-use case pair, at least a portion of previously stored information derived from at least a subset of the set of search results.

19. The system as recited in claim 16, further comprising:
- means for providing a list of at least a portion of the set of search results;
- wherein the indication of at least a portion of the information is provided in conjunction with providing the list of at least a portion of the set of search results.

20. The system as recited in claim 16, further comprising:
- means for ascertaining a search context associated with the search query;
- wherein at least one of determining a set of one or more use cases or identifying a set of one or more search results is further performed based, at least in part, upon the search context.

* * * * *